United States Patent
Alfthan et al.

(10) Patent No.: US 10,920,802 B2
(45) Date of Patent: Feb. 16, 2021

(54) CYLINDER WITH CHECK VALVE

(71) Applicant: Deere & Company, Moline, IL (US)

(72) Inventors: Arto Alfthan, Tarttila (FI); Timo Neuvonen, Punkaharju (FI); Joni Turunen, Joensuu (FI); Samuli Jormanainen, Joensuu (FI); Esa Jääskeläinen, Joensuu (FI)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/242,454

(22) Filed: Jan. 8, 2019

(65) Prior Publication Data
US 2019/0219075 A1    Jul. 18, 2019

(30) Foreign Application Priority Data
Dec. 20, 2017 (EP) .................................... 17208917

(51) Int. Cl.
  F15B 15/14    (2006.01)
  A01G 23/083   (2006.01)
  G01B 3/12     (2006.01)

(52) U.S. Cl.
  CPC .......... *F15B 15/149* (2013.01); *A01G 23/083* (2013.01); *F15B 15/1457* (2013.01); *F15B 15/1476* (2013.01); *G01B 3/12* (2013.01); *F15B 2211/47* (2013.01); *F15B 2211/7051* (2013.01)

(58) Field of Classification Search
  CPC ..... A01G 23/083; G01B 3/12; F15B 15/1476; F15B 15/149
  See application file for complete search history.

(56) References Cited

U.S. PATENT DOCUMENTS

| | | | | |
|---|---|---|---|---|
| 5,802,953 A | * | 9/1998 | Nakamura | F15B 15/1409 91/422 |
| 6,106,343 A | * | 8/2000 | Nakamura | B63H 20/10 440/53 |
| 6,176,170 B1 | | 1/2001 | Uppgard et al. | |
| 2010/0282367 A1 | * | 11/2010 | Stevenson | A01G 23/091 144/336 |
| 2011/0162719 A1 | | 7/2011 | Lundgren et al. | |
| 2013/0177373 A1 | * | 7/2013 | Sintek | B66C 1/427 414/560 |
| 2015/0300378 A1 | * | 10/2015 | Udagawa | E02F 3/32 60/449 |

FOREIGN PATENT DOCUMENTS

EP    2833711 A1    2/2015

OTHER PUBLICATIONS

European Search Report issued in counterpart application No. 17208917.9 dated Jun. 28, 2018 (10 pages).

* cited by examiner

*Primary Examiner* — F Daniel Lopez
*Assistant Examiner* — Daniel S Collins

(57) ABSTRACT

A harvester head having at least one hydraulic actuator with a cylinder and a piston. The hydraulic actuator having at least a cylinder chamber and a piston rod chamber, both chambers being connected to a hydraulic circuit. The piston separating the cylinder chamber and the piston rod chamber, a cavity provided in the piston, hydraulically connecting the cylinder chamber with the piston rod chamber and a check valve in connection with the cavity that allows hydraulic medium flow in an opening direction of the check valve.

2 Claims, 3 Drawing Sheets

CYLINDER WITH CHECK VALVE

FIELD OF THE DISCLOSURE

The present disclosure generally relates to harvester heads and more particularly to hydraulic cylinder of a harvester head.

BACKGROUND OF THE DISCLOSURE

Harvester heads are usually mounted to a boom assembly of a working machine which can be a forest machine or a construction machine which may be used in forestry related tasks.

EP 2 833 711 A1 describes a harvester head and a measuring apparatus for a harvester head where the measuring apparatus is moved into a supporting position against a tree stem or log.

A harvester head is used for various operations in forestry related tasks. The operations may include one or more of grappling and/or felling of a tree, delimbing and/or debarking of a tree stem and/or cutting a tree stem or log. Harvester Heads are usually driven by hydraulic power.

A measuring apparatus is used in harvester heads to measure the length of the tree stem and/or log. The length is usually used to calculate a cutting solution or estimate the number of produced logs. The measuring apparatus measures the length at the time when the tree stem or log is processed by the harvester head. A common measuring apparatus comprises a measuring wheel coupled in an articulated manner to a frame of the harvester head. The measuring wheel usually has a working position for measuring and a non-working position in which no measurement is conducted. In the working position, the measuring wheel is being forced against the surface of a tree stem or log which is held and processed by the harvester head.

The measuring wheel is usually moved from the non-working position into the working position by an articulated frame around a turning axis. The articulated frame is usually swiveled from the non-working position into the working position by hydraulic means, in particular, by a hydraulic actuator. When the harvester head starts processing the tree stem or log, the hydraulic means are activated to move the measuring wheel against the tree stem or log surface and to generate a length measurement.

Harvester heads are generally used in a wide variation of weather or climate conditions. Especially hydraulic means are affected by low temperature conditions in that the hydraulic pressure medium, in particular, hydraulic oil may become very viscous or may generally show low temperature related behavior. The positioning of the hydraulic actuator may become difficult to control and the positioning speed may be decreased or unstable.

Hydraulic oil lines running from a hydraulic manifold to the hydraulic actuators may contain more hydraulic oil volume than available working volume inside the specific hydraulic actuators. When the hydraulic actuators are actuated, hydraulic oil from the hydraulic lines will enter inside the cylinder side or piston side of the specific cylinders but a large remainder of hydraulic oil remains static inside the hydraulic lines and is remaining in a cold temperature state. A similar behavior can be seen for a plurality of hydraulic actuators which work under low temperature conditions. This further affects construction machines or mining machines.

SUMMARY OF THE DISCLOSURE

In one embodiment, a harvester head for forestry applications is disclosed. The harvester head comprises at least one hydraulic actuator with a cylinder and a piston. The hydraulic actuator having at least a cylinder chamber and a piston rod chamber, both chambers being coupled to a hydraulic circuit. An additional hydraulic connection may be parallel to the hydraulic actuator and to both chambers.

The piston may separate the cylinder chamber and the piston rod chamber. A cavity may be provided in the piston, hydraulically coupling or connecting the cylinder chamber with the piston rod chamber. A check valve may be coupled or connected with the cavity, allowing hydraulic medium to flow in an opening direction of the check valve so that hydraulic medium can flow through the cavity and the check valve. The hydraulic medium flow runs through the cavity and the check valve so that it runs from one side of the piston to the other. The hydraulic medium is provided to the hydraulic actuator which can continuously flow through the hydraulic actuator and ensure a complete hydraulic medium volume change. The hydraulic medium flowing through the hydraulic circuit runs towards and from a hydraulic manifold control of the harvester head. Based on the continuous hydraulic medium flow the hydraulic medium can undergo a temperature increase and does not remain at a low-level temperature. The temperature increase improves the viscosity of the hydraulic medium and allows faster control of the hydraulic actuator. Further, the temperature increase of the hydraulic medium allows for better control of the hydraulic actuator and better positioning, so that application can be controlled even under low temperature work conditions.

The piston may separate the cylinder chamber and the piston rod chamber. The additional hydraulic connection may be provided on the outside of the hydraulic actuator, hydraulically coupling the hydraulic circuit parallel to the hydraulic actuator. A check valve may be in connection with the additional hydraulic connection, allowing hydraulic medium to flow in an opening direction of the check valve, so that hydraulic medium flows through the additional hydraulic connection and the check valve. This enables flow of the hydraulic medium in one direction through the check valve even when the hydraulic actuator is not moving. This ensures that the hydraulic medium can maintain a flow through the hydraulic manifold and exchange heat. This will enable the hydraulic medium to reach working temperature and have a faster temperature change rate compared to an ordinary hydraulic cylinder.

The check valve may be arranged to close the hydraulic medium flow when the hydraulic actuator is moving into a working position, and may open the hydraulic medium flow when the hydraulic actuator is moving into a non-working position. The hydraulic medium flow is preferably disabled when the hydraulic actuator moves into the working position. This enables accurate pressure control of the hydraulic medium flow and precise positioning of the piston rod in the working position. The pressure of the hydraulic medium can be kept within estimated limits and the function of the harvester head is ensured. The hydraulic medium flow is however enabled in a non-working position of the hydraulic actuator. The hydraulic medium then can exchange heat and increase its temperature during the non-working cycle.

The hydraulic actuator preferably enables a hydraulic medium flow when the piston rod is retracting. The hydraulic medium can thus flow when the hydraulic actuator is not in a working position. The flow may be maintained as long as the hydraulic actuator is in a non-working position, whether moving or stopping. This enables a temperature increase of the hydraulic medium when the hydraulic actuator is not in use and reduce the necessary time for the increase.

An orifice may be provided downstream next to the check valve in the flow direction of the hydraulic medium through the check valve. The orifice preferably enables a limited flow of the hydraulic medium. When the check valve is open, the reduced flow allows for accurate movement of the piston inside the hydraulic actuator by applying hydraulic pressure and passing of the hydraulic medium through the check valve at the same time.

The orifice may have a smaller diameter than the cavity. This allows additional control of the hydraulic medium flow through the check valve. If the medium pressure is too low the medium flow would be unstable. If the pressure is too high the movement of the piston may be difficult to control.

The hydraulic actuator may be connected with one end of the cylinder side or the piston rod side to an articulated frame and connected on the other side to a harvester head frame, so that the hydraulic actuator can move the articulated frame from a working position into a non-working position or the opposite in relation to the harvester head frame.

The hydraulic actuator may be in a working position, when the cylinder chamber is pressurized, and in a non-working position, when the piston rod chamber is pressurized. The cylinder chamber may be pressurized which allows for the hydraulic actuator to keep an exact pressure level in a working position. The hydraulic actuator enables maintaining the pressure level and supporting the articulated frame in the working position with accurate and repeatable force application.

A measuring apparatus may be attached to the articulated frame, so that the measuring apparatus is moveable from a working position to a non-working position or the opposite. The measuring apparatus can measure the length of the tree log or stem running through the harvester head. By using the articulated frame, the measuring apparatus can be transferred into a working position, where it is pressed against the surface of a tree stem or log and detects movement.

The hydraulic actuator and the articulated frame provide the measuring apparatus with the ability to move between a working and a non-working position in relation to the harvester head frame. Using the measuring apparatus can thus be repeated and the hydraulic medium flow will ensure that the complete hydraulic medium volume heats up. The flow may also be maintained when the hydraulic actuator is not moving.

According to another embodiment of a harvester head, the hydraulic medium may flow from a pressurized side of the hydraulic actuator to a non-pressurized side of the hydraulic actuator through the check valve, so that a constant flow of hydraulic medium is maintained. The constant flow, preferably in a non-working position, ensures that the hydraulic medium volume is over time completely exchanged and does not become static inside the hydraulic circuit hoses or pipes and remains in a cold temperature state. The hydraulic medium can be transferred to a working temperature condition at a faster rate in comparison to an ordinary hydraulic circuit.

The hydraulic medium flow may be restrained downstream of the check valve. Restraining allows the hydraulic medium to build pressure inside the piston rod chamber and thus act on the piston to move the piston rod towards the cylinder side.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

DETAILED DESCRIPTION

Figure 1:
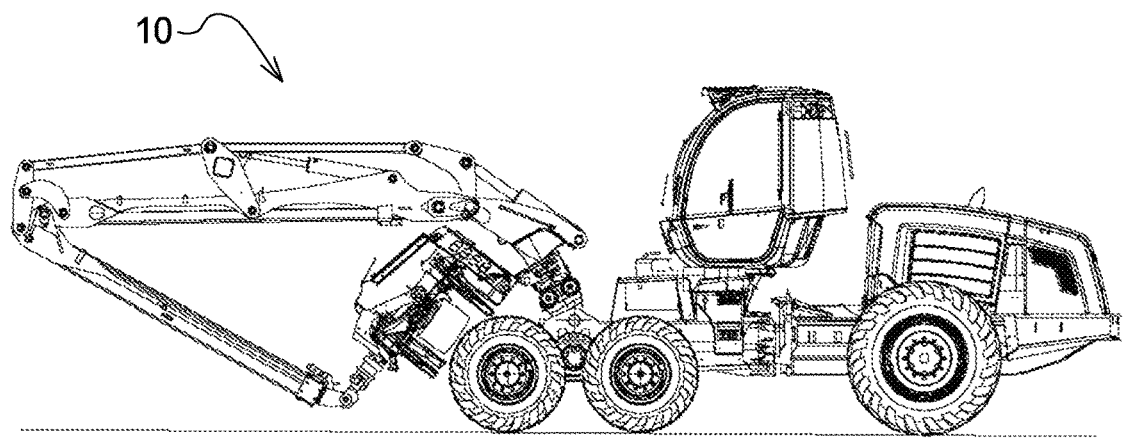
FIG. 1 shows a harvester comprising a harvester head.

FIG. 1 illustrates a forest machine 10, to which a harvester head 11 may be coupled. The illustrated forest machine 10 is a harvester which comprises a boom assembly. The harvester head 11 for the processing of trunks may be coupled to an end of the boom assembly. The forest machine 10 can also be an ordinary construction machine, yet instead of a bucket the harvester head 11 is present.

A hydraulic circuit is used to enable working attachments of machines to actuate the necessary tools, like the harvester head 11 on the forest machine 10. A hydraulic actuator is provided to control the harvester head 11 and is a part of the hydraulic circuit. An ordinary hydraulic circuit comprises a pump which supplies a continuous flow of a hydraulic medium. The flow is returned to a tank or reservoir through a control valve path. During use of the harvester head 11, the control valve is actuated so that the hydraulic medium is supplied from the pump to the hydraulic actuator.

A hydraulic actuator normally comprises a cylinder and a piston which is connected to a piston rod. The piston seals a cylinder sided chamber and in the case of a double acting cylinder also seals a piston rod chamber. Additional seals are provided on the cylinder to form both chambers. By applying hydraulic pressure to the separate chambers the piston is forced in one direction and transfers its force to the working attachments.

Depending on the attachments on the cylinder and on the piston rod side, it is possible to move machine parts so that various machines and working heads for machines may be implemented like a bucket for excavators.

In an ordinary hydraulic actuator, the hydraulic medium will flow through the pipes and hoses connected to the hydraulic actuator only until the hydraulic actuator has reached its end stop or when the hydraulic actuator is moving. The hydraulic medium that was pushed in a cylinder chamber for example, will flow in the opposite direction when the piston rod is retracting again. These conditions allow the hydraulic medium only to flow back and forth inside the hydraulic lines or hoses as far as the volumes of the hydraulic chambers are filled and emptied. In case of low temperature conditions, the hydraulic medium cannot travel through pumps or motors and exchange heat. This applies also in case when the hydraulic lines and hoses are very long and hold more hydraulic fluid volume that the whole hydraulic actuator. The hydraulic medium will remain at low temperatures for a long time period after starting the machine or never reach a sufficient working temperature with a certain viscosity level that ensures quick control response. This affects the positioning of the hydraulic actuator and the force that may be used for in the working position.

Figure 2:
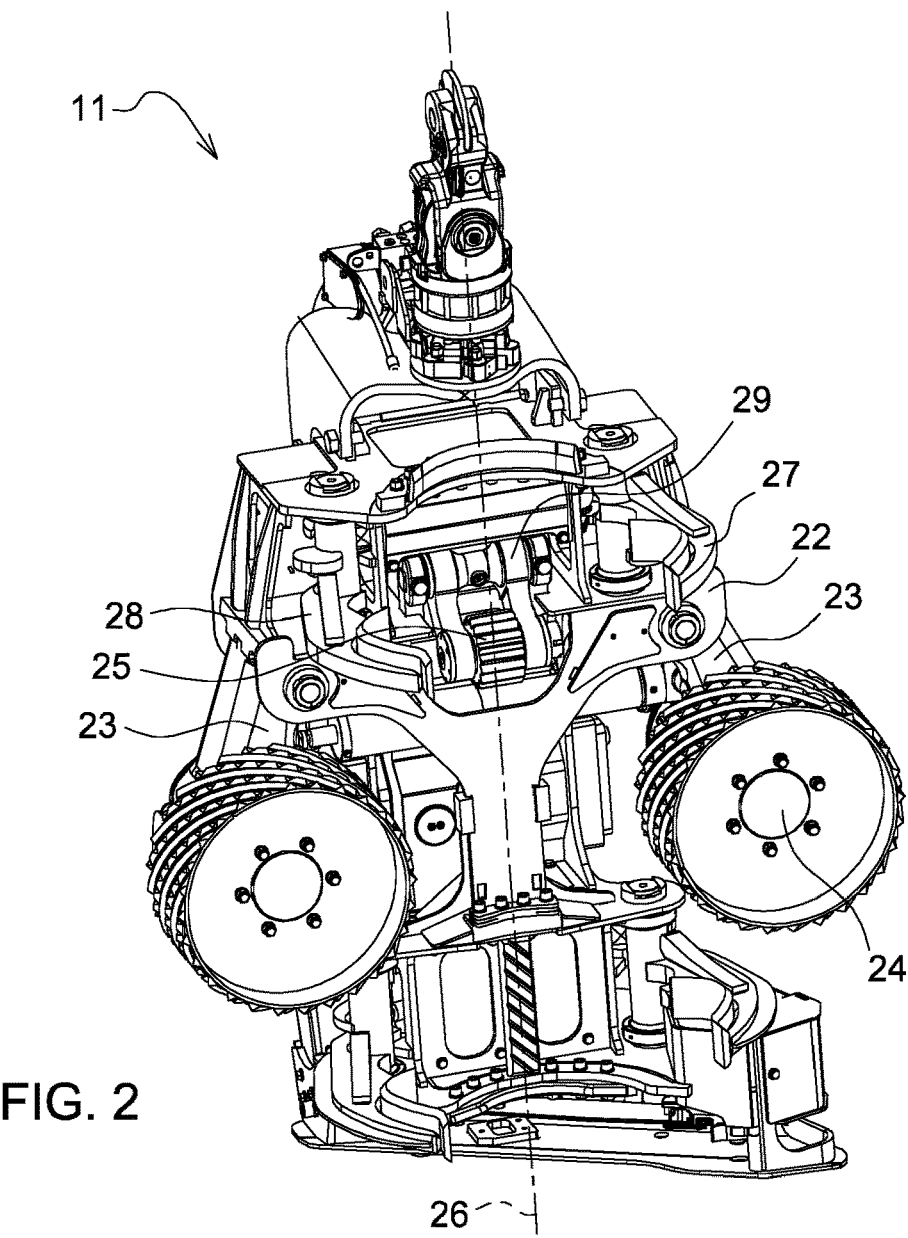
FIG. 2 shows the harvester head of FIG. 1.

FIG. 2 shows a harvester head 11 which is in accordance with the present invention. The harvester head 11 is suitable for cutting, delimbing and debarking of trunks. The harvester head 11 comprises a harvester head frame 22 which processes the tree stem or log and to which mounting arms 23 of feed members 24 are coupled. Furthermore, the harvester head frame 22 comprises either supporting surfaces or supporting rollers, or both, against which the trunk is pressed. A measuring wheel 31 of the measuring apparatus 25 is provided on the harvester head 11.

The feed members 24 are rotatable by a motor, cylindrical in shape, and their outer jacket is equipped with devices and a pattern for cutting through the bark and/or for gripping the trunk for feeding. Normally, at least two feed members 24 are provided, one on each side of the tree trunk. The rotation axes of the feed members 24 are oblique, transverse or perpendicular to a longitudinal direction 26. The feed members 24 may also be made in the shape of a link chain or a crawler. The measuring apparatus 25 is placed in the harvester head frame 22, where it is located in the area between grapple members 27, 28. The grapple members 27, 28 support the trunk and secure the placement of the trunk.

Figure 3:
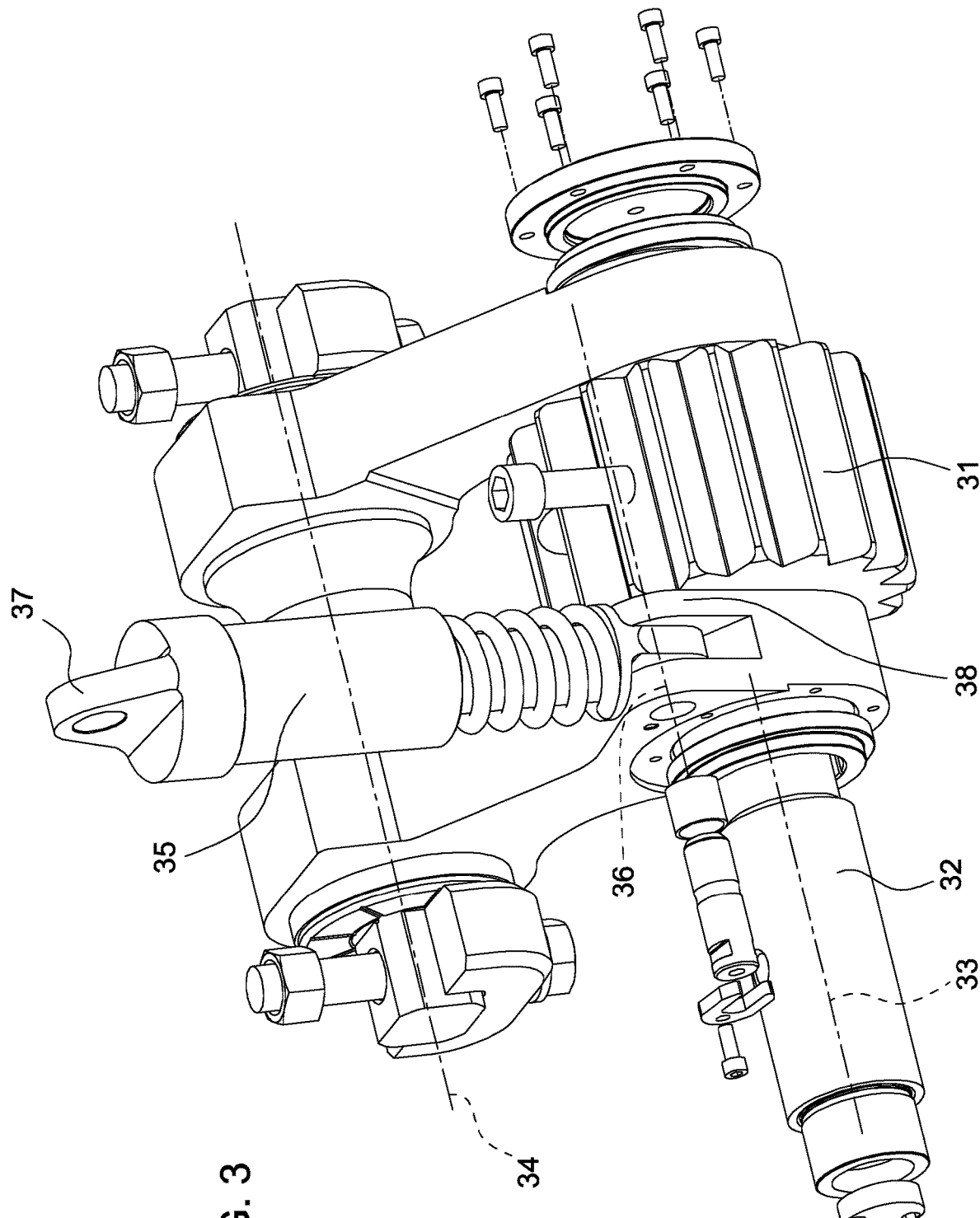
FIG. 3 shows a measuring apparatus of the harvester head of FIG. 1.

FIG. 3 shows a more detailed view of a measuring apparatus 25. The measuring apparatus 25 is suitable for use with a harvester head, for example with the above-presented harvester head 11.

The measuring apparatus 25 comprises an articulated frame 29 and a rotating measuring wheel 31 which is coupled to the articulated frame 29 in such a way that the measuring wheel 31 is free to rotate. The measuring wheel 31 is mounted on e.g. a shaft 32 with both ends of the shaft mounted on the articulated frame 31 via a bearing such to rotate around the axis of the shaft 32. The shaft 32 is parallel to a rotation axis 33, and the shaft 32 may rotate together with the measuring wheel 31 around the rotation axis 33. The measuring wheel 31 is placed between the ends of the shaft 32.

The rotation axis 33 of the measuring wheel 31 is normally placed in such a way that it is perpendicular or extends transversely to the longitudinal direction 26 of the tree trunk. The width of the measuring wheel 31 is configured so that it can be equipped with a desired pattern by means of e.g. elongated blades or cogs which are parallel or oblique to the rotation axis 33. The measuring apparatus 25 may comprise sensors to find the rotational angle of the measuring wheel 31 in the working position.

The articulated frame 29 may be mounted on the harvester head frame 22, wherein the measuring wheel 31 and the articulated frame 29 are allowed to swing relative to the harvester head frame 22. Said swinging motion allows the movement of the measuring wheel 31 along the varying contour of the tree trunk. The articulated frame 29 swings with respect to a rotation axis 34. The measuring wheel 31 can be mounted on the harvester head frame 22 on both sides of the articulated frame 29.

The measuring apparatus 25 is mounted on the harvester head frame 22 in such a way that the measuring wheel 31 can swing to a position in which it is pressed against the tree stem or log held in the harvester head 11. If the tree stem or log has a shape that brings it further away from the harvester head frame 22, the swinging motion of the measuring apparatus 25 can be used to keep the measuring wheel 31 pressed against the trunk. The rotation axis 34 of said swinging motion is parallel to the rotation axis 33.

A hydraulic actuator 35 is also connected to the measuring apparatus 25. Preferably, a first end 36 of the hydraulic actuator 35 is mounted on the articulated frame 29 by means of a joint 38. The rotation axis of the joint 38 is parallel to the rotation axis 33.

There is one hydraulic actuator 35. According to another embodiment, there may be two hydraulic actuators 35 and they may be placed in parallel, next to each other.

The joint 38 is spaced from rotation axis 34, wherein the force generated by the hydraulic actuator 35 produces a torque that is capable of rotating the articulated frame 29 in respect of harvester head frame 22. The hydraulic actuator 35 is placed in the harvester head frame 22 in such a way that the hydraulic actuator 35 generates a force that presses the measuring wheel 31 against the tree trunk.

An opposite second end 37 of the hydraulic actuator 35 is supported to the harvester head frame 22 or another corresponding element that provides a sufficient counter force for the force generated by the hydraulic actuator 35. The force generated by the hydraulic actuator 35 pushes the measuring wheel 31 against the tree trunk. The generated force is transmitted via the joint 38 and the articulated frame 29.

The swinging motion of the measuring apparatus 25 is limited as desired, for example by means of the hydraulic actuator 35 or by providing a stopping member in the harvester head frame 22, for example a stopper, a barrier or another device for limiting the movement.

Figure 4:
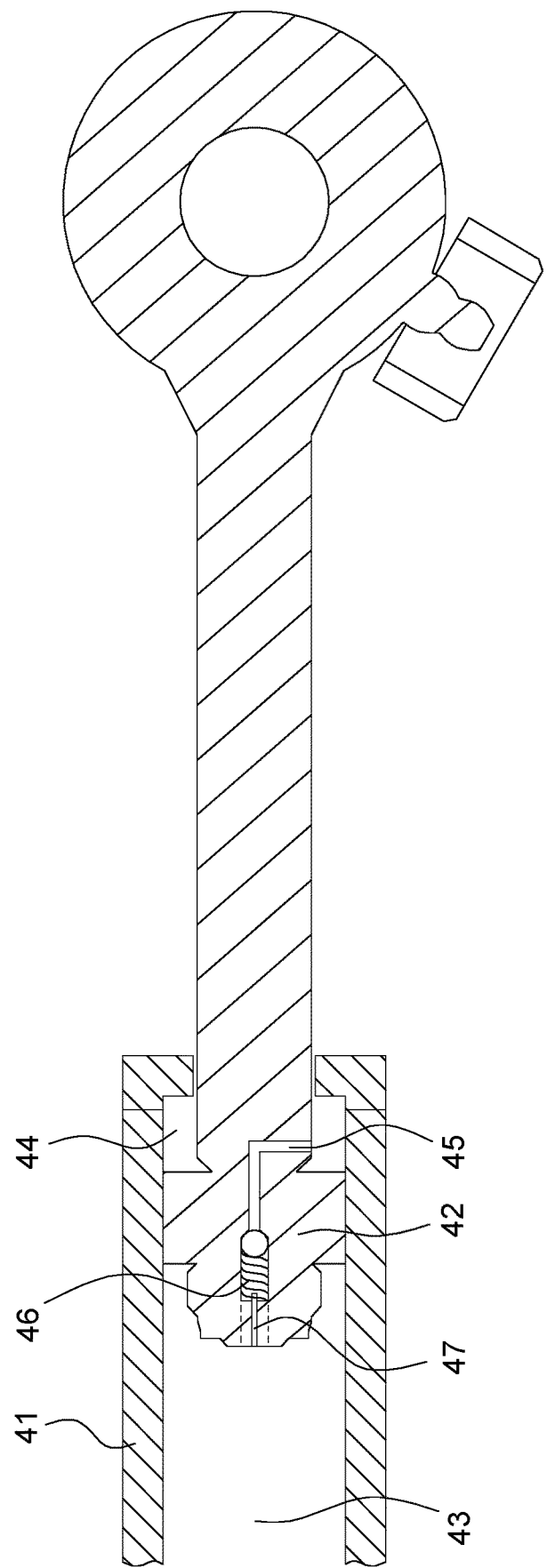
FIG. 4 shows a hydraulic actuator of the harvester head of FIG. 1.

FIG. 4 shows a hydraulic actuator 35 according to the present invention. The hydraulic actuator 35 can be used with a hydraulic pressure medium, preferably hydraulic oil. The illustrated hydraulic actuator 35 comprises a cylinder 41 and a piston 42 which is connected to a piston rod. The piston 42 separates the hydraulic actuator 35 in two distinct chambers, a cylinder chamber 43 and a piston rod chamber 44. Both chambers 43, 44 are connected to a hydraulic circuit by commonly known connections.

The piston 42 has a cavity 45 which is connected to the piston rod chamber 44 and allows hydraulic medium to flow inside the cavity 45 and to a check valve 46 which is also provided inside the piston 42 and connected to the cavity 45. The check valve 46 allows the flow of hydraulic medium in one direction and blocks the flow of the hydraulic medium in the opposite direction. In the embodiment, the check valve 46 enables hydraulic flow from the piston rod chamber 44 to the cylinder chamber 43. It is possible to switch the position and opening direction of the check valve 46 so that the hydraulic flow allowed by the check valve 46 may flow from the cylinder chamber 43 to the piston rod chamber 44 depending on the requirement.

Seen in the direction of the flow there is an orifice 47 behind the check valve 46. The orifice 47 limits the diameter for the flow path behind the check valve 46. The diameter can be dimensioned so that the hydraulic actuator 35 will travel at an acceptable rate, depending on the usage, and still allow an adequate amount of hydraulic medium to flow through the connection comprising the cavity 45, the check valve 46 and the orifice 47.

In the embodiment of FIG. 4, the hydraulic actuator 35 has an end stop when the piston rod is fully extended and an end stop when the piston rod is fully retracted into the cylinder 41. Such a hydraulic actuator 35 may be used for moving and acting on the measuring apparatus 25 for the harvester head 11. Yet, it may also be used for various other applications, such as actuating feeding members, opening and closing grapping members or controlling tilt arms. The use may also extend to hydraulic actuators in constructions machines or off-road machines in general.

In the embodiment shown, the hydraulic actuator 35 acts on the articulated frame 29 to which the measuring apparatus 25 is attached. When the hydraulic actuator 35 is extending, the measuring apparatus 25 is in a working position. The working position is not limited to the end stop but to the cylinder chamber 43 being under pressure by the hydraulic medium when the measuring apparatus 25 is pressed against the tree stem surface. Consequently, the measuring apparatus 25 is in a non-working position when the piston rod chamber 44 is under pressure or the measuring apparatus 25 is not pressed against the tree stem surface.

When the hydraulic actuator 35 is in the working position, the cylinder chamber 43 is under hydraulic pressure and the piston rod is extending or at least is forcing the articulated frame 29 and the measuring wheel 31 towards the surface of a tree stem or log. The check valve 46 blocks any hydraulic medium flow so that the pressure can be used without loss. When the measuring apparatus 25 is not in use, the hydraulic pressure is built inside the piston rod chamber 44 and the piston rod will begin to retract. When a certain pressure limit is reached, the check valve 46 will open and allow the flow from one chamber 43, 44 to the other. Yet, even with the check valve 46 in open condition, the pressure may be adjusted by the diameter of the orifice 47 so that the retraction in ensured while the hydraulic flow is happening.

The embodiment enables the hydraulic medium to travel or flow continuously in one direction when the hydraulic actuator 35 is in non-working position. This flow ensures that the hydraulic medium can reach heat exchangers, motors and pumps so that the temperature can be increased in a short period of time after work starts so that the viscosity can be reduced at a faster rate and the low temperature conditions are limited to the beginning of the work phase of the machine only.

Additional sensors for the hydraulic circuit may be provided. These sensors may a temperature of the hydraulic medium. An additional circuit control may be provided so that the flow rate of the circuit may be controlled in relation to a temperature level of the hydraulic medium.

What is claimed is:

1. A harvester head for forestry applications comprising:
at least one hydraulic actuator with a cylinder and a piston,
the hydraulic actuator having at least a cylinder chamber and a piston rod chamber, the piston separating the cylinder chamber and the piston rod chamber,
the cylinder chamber and the piston rod chamber being connected to a hydraulic circuit,
a cavity is provided in the piston, hydraulically coupling the cylinder chamber with the piston rod chamber,
a check valve is in connection with the cavity, allowing a hydraulic medium flow in an opening direction of the check valve, so that hydraulic medium can flow through the cavity and the check valve,
wherein an orifice is provided downstream next to the check valve in the flow direction of the hydraulic medium through the check valve,
wherein the orifice has a smaller diameter than the cavity.

2. A harvester head for forestry applications comprising:
at least one hydraulic actuator with a cylinder and a piston,
the hydraulic actuator having at least a cylinder chamber and a piston rod chamber, the piston separating the cylinder chamber and the piston rod chamber,
the cylinder chamber and the piston rod chamber being connected to a hydraulic circuit,
a cavity is provided in the piston, hydraulically coupling the cylinder chamber with the piston rod chamber,
a check valve is in connection with the cavity, allowing a hydraulic medium flow in an opening direction of the check valve, so that the hydraulic medium can flow through the cavity and the check valve,
wherein the hydraulic medium flow is reduced downstream of the check valve.

* * * * *